United States Patent [19]
Sugimoto

[11] Patent Number: 5,855,529
[45] Date of Patent: Jan. 5, 1999

[54] APPARATUS FOR GUIDING A CONTROL CABLE

[75] Inventor: Masanori Sugimoto, Osakasayama, Japan

[73] Assignee: Shimano, Inc., Osaka, Japan

[21] Appl. No.: 856,719

[22] Filed: May 14, 1997

[51] Int. Cl.⁶ .................................. F16C 1/10; B62L 3/00
[52] U.S. Cl. ..................... 474/80; 74/502.6; 188/24.12; 254/394
[58] Field of Search ............... 474/78–82; 74/500.5, 74/502.2, 502.3, 502.4, 502.6; 188/24.22, 24.21, 24.12, 24.11, 2 D; 254/394, 395, 397

[56] References Cited

U.S. PATENT DOCUMENTS

| | | | |
|---|---|---|---|
| 3,008,343 | 11/1961 | Wasley | 74/502.6 |
| 3,847,028 | 11/1974 | Bergles | 474/80 |
| 3,979,962 | 9/1976 | Kebsch | 74/217 B |
| 4,306,871 | 12/1981 | Nagano | 474/82 |
| 4,437,848 | 3/1984 | Shimano | 474/82 |
| 5,012,900 | 5/1991 | Ishibashi | 188/24.12 |
| 5,346,434 | 9/1994 | Hsu | 474/82 |
| 5,620,383 | 4/1997 | Patterson | 474/80 |
| 5,624,334 | 4/1997 | Lumpkin | 474/79 |
| 5,732,598 | 3/1998 | Shoge et al. | 74/475 |

FOREIGN PATENT DOCUMENTS 577113  5/1946  United Kingdom .................. 74/502.6

OTHER PUBLICATIONS

U.S. Patent Application No. 08/396,123; to issue Sep. 8, 1998 as U.S. Patent 5,802,923.

*Primary Examiner*—Thomas R. Hannon
*Attorney, Agent, or Firm*—James A. Deland

[57] ABSTRACT

An apparatus for guiding a cable includes a frame and a cable guide member mounted to the frame for rotation around a guide member axis. The cable guide member includes a curved outer peripheral cable guide surface disposed radially outwardly from the guide member axis for guiding the cable. A bearing having a cable guide surface is disposed radially outwardly from the outer peripheral cable guide surface. When the cable guide member has a small radius of curvature, the cable may contact the bearing and thus avoid the excessive friction encountered in the prior art.

67 Claims, 4 Drawing Sheets

APPARATUS FOR GUIDING A CONTROL CABLE

BACKGROUND OF THE INVENTION

The present invention is directed to mechanical control cable mechanisms and, more particularly, to an apparatus for guiding a control cable that may be used to control brake or gear shifting devices on a bicycle.

Bicycle brake and shifting devices frequently use control cables of the type wherein an inner cable slides within an outer casing. Such control cables usually are connected between a controlling device, such as brake lever, a shifting lever or twist grip shifter, and a controlled device such as a brake or a transmission. Since the controlled device ordinarily is located at some distance from the controlling device, and since the controlled device ordinarily is mounted at a fixed position determined by the configuration of the bicycle, the control cable often must follow a curved path from the controlling device to the controlled device. Unfortunately, when the cable must follow a steep curve, the outer casing sometimes cannot bend satisfactorily, or else the friction between the inner cable and the outer casing caused by the curve becomes excessive. As a result, such steep curves cannot be accommodated by the control cable.

One technique used to overcome the problem of bending the outer casing to follow sharp curves involves using a roller mounted on a frame, wherein the radius of curvature of the outer peripheral surface of the roller is set to match the required curve. The frame may include a cable entry portion and a cable exit portion, wherein the inner wire enters the cable entry portion, passes around the roller, and exits the cable exit portion. While this technique is satisfactory for many applications, the radius of the roller can not be made too small because the inner cable also resists bending. For example, when an inner wire is constructed of multiple strands wound together, the optimum radius of the roller is 200 times the diameter of a single strand. For a typical strand diameter of 0.32 millimeters, the optimum roller radius then would be approximately 64 millimeters. Such a roller is extremely large and would be unacceptable for many applications. Consequently, smaller rollers are used despite the fact that such smaller rollers are not preferred. However, even though the inner cable may be forced to pass over the outer peripheral surface of such a smaller roller, the inner cable resists such bending and tends to rub against the cable entry portion and the cable exit portion of the frame. The smaller the radius of the roller, the greater the resistance to bending by the wire, and the greater the rubbing. Such rubbing can cause excessive friction, thus eliminating the benefit of using a roller to guide the inner cable around steep curves.

SUMMARY OF THE INVENTION

The present invention is directed to an apparatus for guiding a control cable of the type wherein the cable may be guided around steep curves without excessive friction. In one embodiment of the present invention, an apparatus for guiding a cable includes a frame and a cable guide member mounted to the frame for rotation around a guide member axis. The cable guide member includes a curved outer peripheral cable guide surface disposed radially outwardly from the guide member axis for guiding the cable. A bearing having a cable guide surface is disposed radially outwardly from the outer peripheral cable guide surface. When the cable guide member has a small radius of curvature, the cable may contact the bearing and thus avoid the excessive friction encountered in the prior art.

In another embodiment of the present invention, an apparatus for guiding a control cable includes a frame and a cable guide member mounted to the frame for rotation around a guide member axis. The cable guide member includes a curved outer peripheral cable guide surface disposed radially outwardly from the guide member axis for guiding the cable. A first bearing having a first bearing cable guide surface is disposed radially outwardly from the outer peripheral cable guide surface, and a second bearing having a second bearing cable guide surface is disposed radially outwardly from the outer peripheral cable guide surface. The first bearing is spaced apart from the second bearing in a circumferential direction of the outer peripheral cable guide surface. When the cable guide member has a small radius of curvature, the cable may contact the first and second bearings and again avoid the excessive friction encountered in the prior art.

In a more specific embodiment, the frame includes a first cable duct and a second cable duct. The first cable duct includes a first opening that tangentially aligns with the outer peripheral cable guide surface of the cable guide member, and the second cable duct includes a second opening that tangentially aligns with the outer peripheral cable guide surface of the cable guide member. The inner wire passes through the first cable duct, passes around the outer peripheral guide surface of the cable guide member and passes through the second cable duct. The first bearing is aligned between the first cable duct and the outer peripheral guide surface of the cable guide member, and the second bearing is aligned between the second cable duct and the outer peripheral guide surface of the cable guide member. The bearings are thus positioned for maximum reduction of friction when the outer peripheral cable guide surface has a small radius of curvature. If desired, the first and second bearings may comprise first and second rollers which accommodate the cable with very small friction.

In another embodiment of the present invention, an apparatus for guiding a cable includes a frame and a cable guide member mounted to the frame for rotation around a guide member axis. The cable guide member includes a curved outer peripheral cable guide surface disposed radially outwardly from the guide member axis for guiding the cable, wherein the cable guide surface terminates at first and second ends. The cable guide member includes a first abutment and the frame includes a second abutment for contacting the first abutment and for limiting a range of motion of the cable guide member. In a more specific embodiment, the cable guide member and the cable guide surface each has an approximately semicircular shape. The cable guide member includes a bounded opening forming a first abutment and a second abutment, and the frame includes a projecting member which forms a third abutment disposed between the first and second abutments for contacting the first and second abutments and for limiting a range of motion of the cable guide member. A cable guide member constructed in this manner has a reduced size and weight over prior art structures.

A cable guide constructed according to the present invention may be used wherever cable bends are desired. For example, the cable guide may be positioned at a controlling device such as a brake lever, shifting lever, twist grip shifter or other controlling device. Alternatively, the cable guide may be positioned at a controlled device such as a brake arm, hub brake, derailleur, internal hub transmission, or other controlled device.

DETAILED DESCRIPTION OF THE EMBODIMENTS

Figure 1:
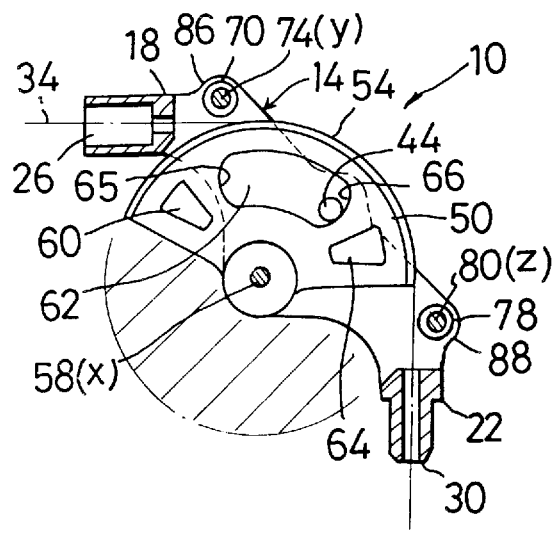
FIG. 1 is a partial cross sectional front view of a particular embodiment of a cable guide according to the present invention.
Figure 2:
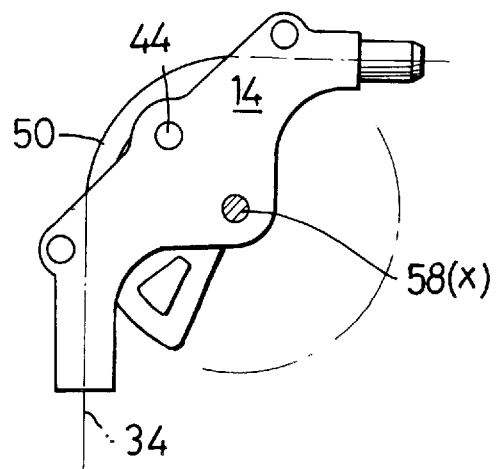
FIG. 2 is a rear view of the apparatus shown in FIG. 1.
Figure 3:
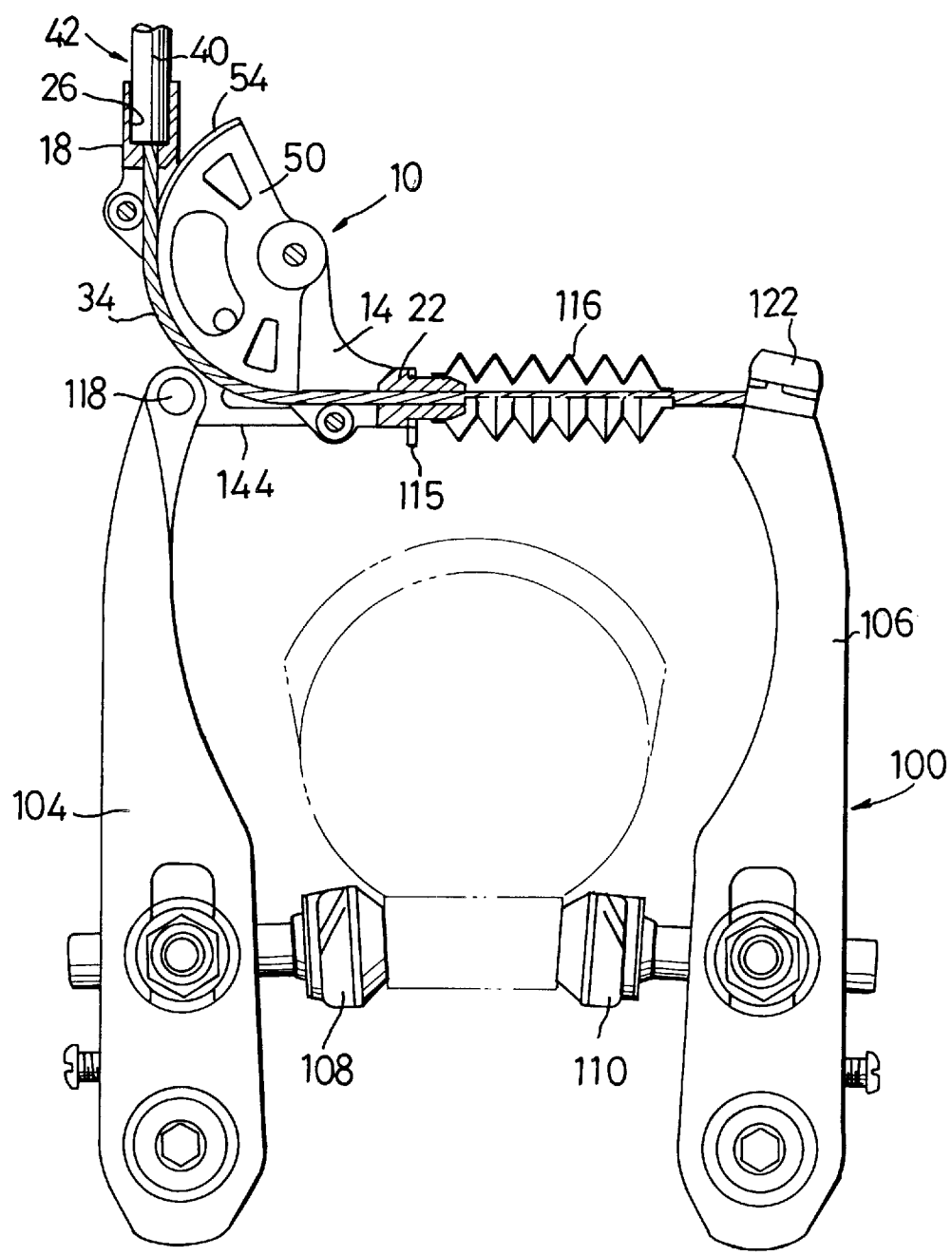
FIG. 3 shows the apparatus of FIGS. 1 and 2 attached to a brake arm.

FIG. 1 is a partial cross sectional front view of a particular embodiment of a cable guide 10 according to the present invention, and FIG. 2 is a rear view of cable guide 10. As shown in those Figures, cable guide 10 includes a frame 14 having a first cable duct 18 and a second cable duct 22. In this embodiment, first and second cable ducts 18 and 22 are formed as tubular members having first and second cable duct openings 26 and 30. As shown in FIGS. 1 and 3, first cable duct opening 26 is sized for receiving an outer casing 40 of a control cable 42 therein, and second cable duct opening 30 is sized for receiving an inner cable 34 of control cable 42 therethrough.

A cable guide member 50 having a curved outer peripheral cable guide surface 54 is mounted to frame 14 through a pivot shaft 58 for rotation around a guide member axis X. In this embodiment, cable guide member 50 and cable guide surface 54 each has a roughly semicircular shape and includes openings 60, 62 and 64 to reduce the size and weight of the structure. Opening 62 includes abutments 65 and 66 which cooperate with an abutment formed by a stop pin 44 extending from a side of frame 14 to limit the range of motion of cable guide member 50. Opening 62 should have an angular distance that corresponds roughly to the intended cable stroke. Stop pin 44 and abutments 65 and 66 allow the use of a cable guide member 50 having a semicircular shape without the risk of the inner cable 34 falling off the cable guide surface 54.

A first bearing in the form of a first roller 70 is mounted to frame 14 through a pivot shaft 74 for rotation around a first roller axis Y, and a second bearing in the form of a second roller 78 is mounted to frame 14 through a pivot shaft 80 for rotation around a second roller axis Z, wherein guide member axis X, first roller axis Y and second roller axis Z are substantially parallel to each other. Roller 70 is disposed radially outwardly from outer peripheral cable guide surface 54 in close proximity to first cable duct 18 and is aligned between first cable duct 18 and outer peripheral cable guide surface 54. Similarly, roller 78 is disposed radially outwardly from outer peripheral cable guide surface 54 in close proximity to second cable duct 22 and is aligned between second cable duct 22 and outer peripheral cable guide surface 54. In this embodiment, cable guide member 50, first roller 70 and second roller 78 are completely exposed on frame 14.

As shown in FIG. 1, first and second cable duct openings 26 and 30 both are substantially tangentially aligned with outer peripheral cable guide surface 54. Furthermore, first and second rollers 70 and 78 include respective first and second cable guide surfaces 86 and 88 that lie substantially in the same plane as outer peripheral cable guide surface 54. In this embodiment, first and second rollers 70 and 78 are positioned at substantially the same radial distance from guide member axis X. Inner cable 34 passes through first cable duct opening 26, passes around outer peripheral cable guide surface 54, and passes through second cable duct opening 30. If outer peripheral cable guide surface 54 has a small radius of curvature and therefore defines a steep curve such that inner cable 34 resists bending around outer peripheral cable guide surface 54, then inner cable 34 will contact first cable guide surface 86 and/or second cable guide surfaces 88. Unlike prior art structures, very little friction is created between inner cable 34 and rollers 70 and 78, so cable performance is not adversely affected. In this embodiment, cable guide member 50 may have a radius of 17.5 millimeters or more, preferably 19.2 millimeters, or 20 millimeters to the centerline of the inner cable.

FIG. 3 shows cable guide 10 mounted to a brake assembly 100. In this embodiment, brake assembly 100 includes a brake arm 104 and a brake arm 106. A brake shoe 108 is mounted to an intermediate portion of brake arm 104, and a brake shoe 110 is mounted to an intermediate portion of brake arm 106. A connecting link 114 having a mounting flange 115 is pivotably mounted to the upper end of brake arm 104 through a pivot shaft 118, and a wire connector 122 is disposed at the upper end of brake arm 106. Frame 14 of cable guide 10 is mounted to connecting link 114 by inserting second cable duct 22 into mounting flange 115. Outer casing 40 of a control cable 42 is fitted within first cable duct opening 26, and the end of inner cable 34 is fixed to wire connector 122. A sealing member 116 is fitted around second cable duct 22 and inner wire 34 to help prevent contaminants from entering second cable duct 22. As a result of cable guide member 50, first roller 70 and second roller 78, inner cable 34 bends around an angle of approximately 90° with little friction as it proceeds from brake arm 104 to brake arm 106.

Figure 4:
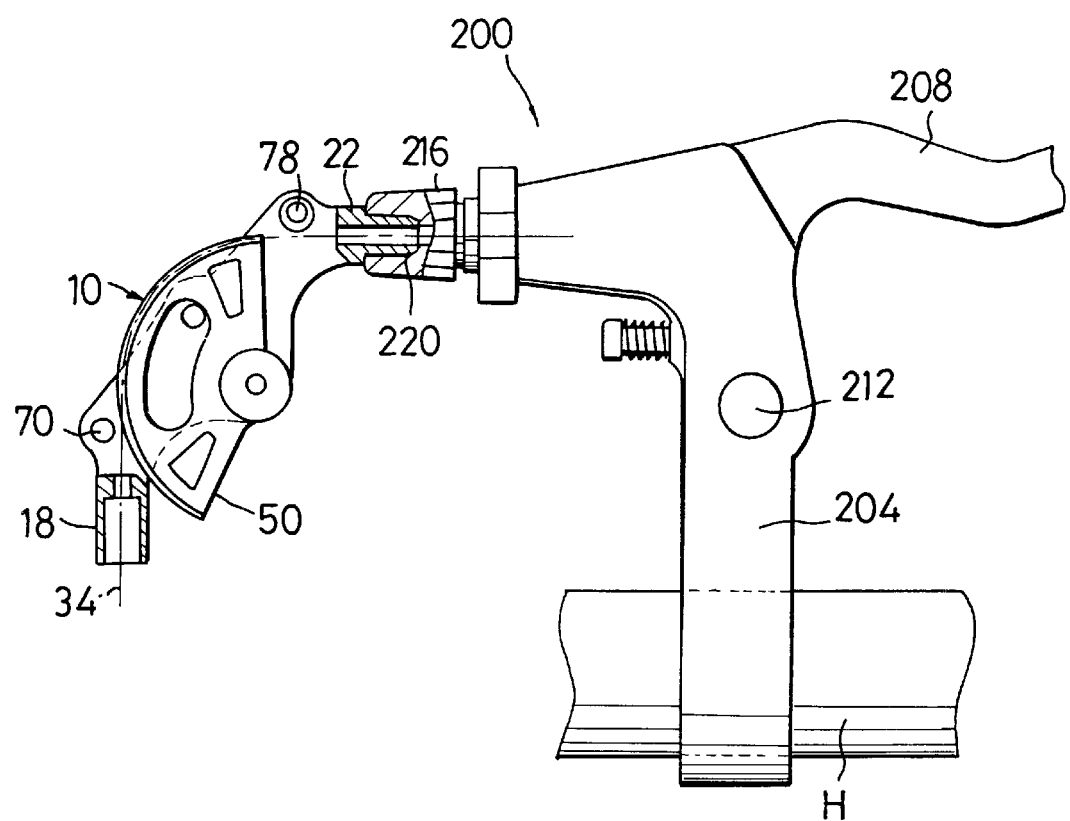
FIG. 4 shows the apparatus of FIGS. 1 and 2 attached to a control lever.

FIG. 4 shows the cable guide 10 mounted to a control lever assembly 200. In this embodiment, a mounting bracket 204 is structured for mounting a control member such as a brake lever 208 to a handlebar H. Brake lever 208 is pivotably mounted to mounting bracket 204 through a pivot shaft 212, and mounting bracket 204 includes a cable adjustment barrel 216 having a barrel opening 220 through which inner cable 34 passes. Frame 14 of cable guide 10 is mounted to mounting bracket 204 by inserting second cable duct 22 into barrel opening 220. As a result of cable guide member 50, first roller 70 and second roller 78, inner cable 34 bends around an angle of approximately 90° with little friction as it proceeds from first cable duct 18 to the cable attachment point (not shown) on lever 208.

Figure 5:
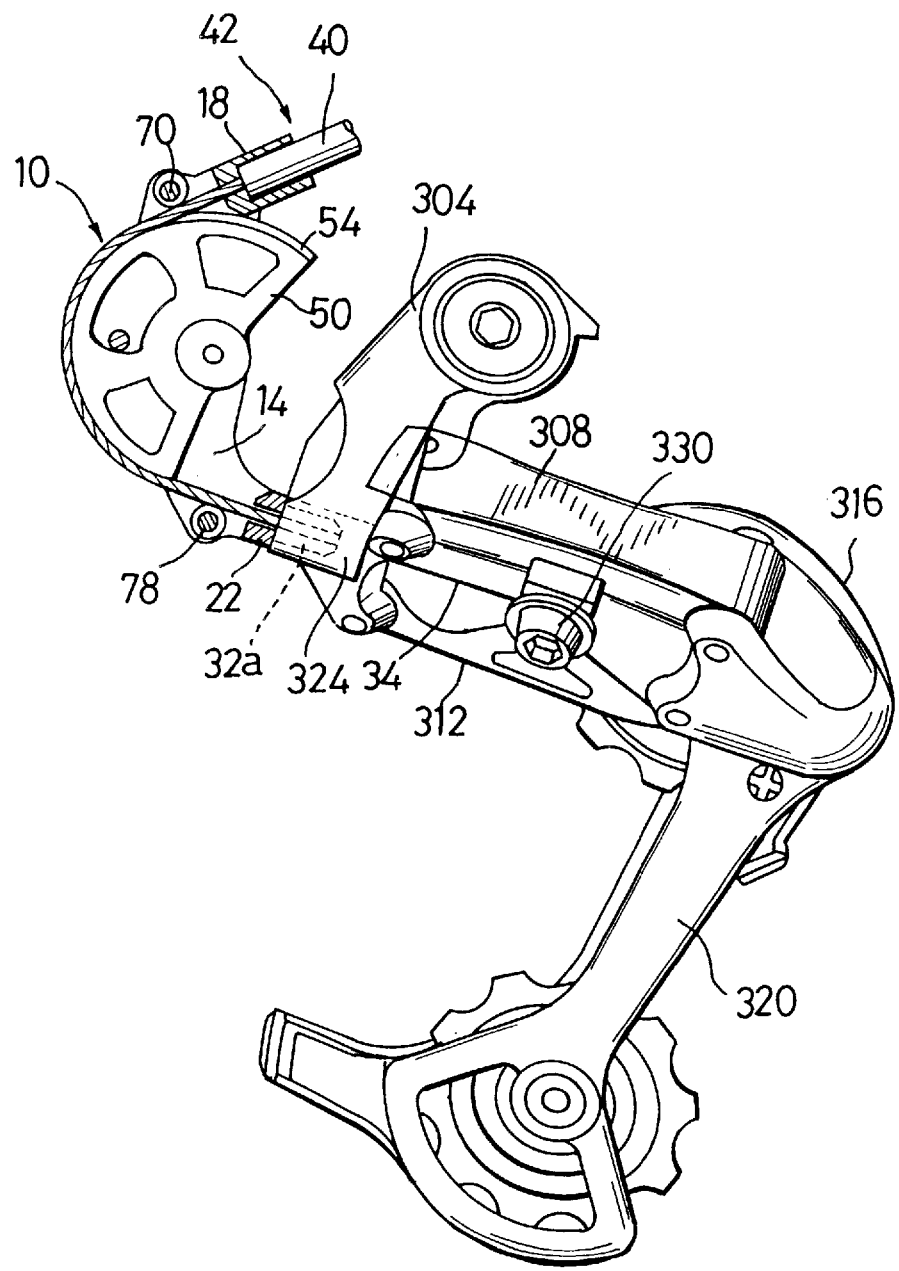
FIG. 5 shows the apparatus of FIGS. 1 and 2 attached to a derailleur.

FIG. 5 shows the cable guide 10 mounted to a derailleur 300. Derailleur 300 may be a conventional derailleur that includes a base member 304 which mounts derailleur 300 to a bicycle frame (not shown), link members 308 and 312, and a movable member 316 supporting a chain guide 320. Base member 304, link members 308 and 312, and movable member 316 are connected together in the conventional way to form a four-bar linkage mechanism for guiding chain guide 320 among a plurality of sprockets (not shown) mounted to a rear wheel of the bicycle. Of course, the invention also could be applied to a front derailleur, and derailleurs other than a four-bar linkage type may be used as well. In this embodiment, first cable duct 18 and second cable duct 22 form an acute angle, rather than the 90° angle formed in the previous embodiments. Frame 14 of cable guide 10 is mounted to derailleur 300 by inserting second cable duct 22 into an opening 322 of a cable guide 324 formed in base member 304. In a conventional derailleur, opening 322 ordinarily is sized for receiving outer casing 40 of control cable 42, so second cable duct 22 has approximately the same outside diameter as outer casing 40. Inner cable 34 of control cable 42 passes through cable guide 324 and attaches to a cable connector 330 fixed to the side of link 308. As a result of cable guide member 50, first roller 70 and second roller 78, inner cable 34 can bend around a very acute angle (or any desired angle) with little friction as it proceeds from first cable duct 18 to cable connector 330.

While the above is a description of various embodiments of the present invention, further modifications may be employed without departing from the spirit and scope of the present invention. For example, cable guide member 50 may be formed as a full circle as shown in phantom in FIG. 1 instead of a semicircle. Cable guide member may be formed as a solid, and stop pin 44 may be omitted. Frame 14 may be formed to cover part or all of cable guide member 50, first roller 70 or second roller 78 rather than leaving these components exposed. Rollers 70 and 78 may be replaced by solid members having low coefficients of friction. First cable duct 18 and second cable duct 22 may be shaped to mate with any desired structure, and they may be placed at whatever orientation is desired to make the inner cable bend at the desired angle. The components may be formed from many different materials. For example, cable guide member 50, first roller 70 and second roller 78 may be formed from POM, and frame 14 may be formed from aluminum. Thus, the scope of the invention should not be limited by the specific structures disclosed. Instead, the true scope of the invention should be determined by the following claims.

What is claimed is:

1. An apparatus for guiding a cable comprising:
   a frame;
   a cable guide member mounted to the frame for rotation around a guide member axis, wherein the cable guide member includes a curved outer peripheral cable guide surface disposed radially outwardly from the guide member axis for guiding the cable;
   a bearing disposed radially outwardly from the outer peripheral cable guide surface, wherein the bearing has a bearing cable guide surface; and
   wherein the bearing comprises a roller that rotates around an axis substantially parallel to the guide member axis.

2. The apparatus according to claim 1 wherein the frame includes a cable duct having a duct opening that aligns between the outer peripheral cable guide surface and the bearing, and wherein the bearing is aligned between the cable duct and the outer peripheral guide surface.

3. The apparatus according to claim 2 wherein the duct opening substantially tangentially aligns with the outer peripheral cable guide surface.

4. The apparatus according to claim 1 wherein the cable guide surface terminates at a radially inwardly extending abutment when viewed along the guide member axis.

5. The apparatus according to claim 4 wherein the cable guide surface has a substantially semicircular shape when viewed along the guide member axis.

6. An apparatus for guiding a cable comprising:
   a frame;
   a cable guide member mounted to the frame for rotation around a guide member axis, wherein the cable guide member includes a curved outer peripheral cable guide surface disposed radially outwardly from the guide member axis for guiding the cable;
   a first bearing comprising a first roller disposed radially outwardly from the outer peripheral cable guide surface for rotation around a first axis substantially parallel to the guide member axis, wherein the first bearing has a first bearing cable guide surface;
   a second bearing comprising a second roller disposed radially outwardly from the outer peripheral cable guide surface for rotation around a second axis substantially parallel to the guide member axis, wherein the second bearing has a second bearing cable guide surface; and
   wherein the first bearing is spaced apart from the second bearing in a circumferential direction of the outer peripheral cable guide surface.

7. The apparatus according to claim 6 wherein the outer peripheral cable guide surface, the first bearing cable guide surface and the second bearing cable guide surface lie in a common plane.

8. The apparatus according to claim 6 wherein the cable guide surface terminates at a radially inwardly extending abutment when viewed along the guide member axis.

9. The apparatus according to claim 8 wherein the cable guide surface has a substantially semicircular shape when viewed along the guide member axis.

10. The apparatus according to claim 6 wherein the frame includes a first cable duct and a second cable duct.

11. The apparatus according to claim 10 wherein the first cable duct comprises a first tubular member through which the cable passes, and wherein the second cable duct comprises a second tubular member through which the cable passes.

12. The apparatus according to claim 10 wherein the first cable duct includes a first opening that substantially tangentially aligns with the outer peripheral cable guide surface, and wherein the second cable duct includes a second opening that substantially tangentially aligns with the outer peripheral cable guide surface.

13. The apparatus according to claim 10 wherein the first bearing is disposed in close proximity to the first cable duct, and wherein the second bearing is disposed in close proximity to the second cable duct.

14. The apparatus according to claim 10 wherein the first bearing is aligned between the first cable duct and the outer peripheral guide surface, and wherein the second bearing is aligned between the second cable duct and the outer peripheral guide surface.

15. The apparatus according to claim 14 wherein the first cable duct includes a first opening that substantially tangentially aligns with the outer peripheral cable guide surface, and wherein the second cable duct includes a second opening that substantially tangentially aligns with the outer peripheral cable guide surface.

16. The apparatus according to claim 10 wherein the first cable duct is spaced apart from the second cable duct.

17. The apparatus according to claim 16 wherein the first cable duct comprises a first tubular member through which the cable passes, and wherein the second cable duct comprises a second tubular member through which the cable passes.

18. The apparatus according to claim 17 wherein the cable guide member is substantially exposed.

19. The apparatus according to claim 18 wherein the first and second rollers are substantially exposed.

20. The apparatus according to claim 6 wherein the cable guide surface terminates at first and second ends.

21. The apparatus according to claim 20 wherein the cable guide surface has an approximately semicircular shape.

22. The apparatus according to claim 20 wherein the cable guide member has an approximately semicircular shape.

23. The apparatus according to claim 20 wherein the cable guide member includes a first abutment, and wherein the frame includes a second abutment for contacting the first abutment and for limiting a range of motion of the cable guide member.

24. The apparatus according to claim 23 wherein the cable guide member includes a bounded opening which forms the first abutment, and wherein the frame includes a projecting member which forms the second abutment.

25. The apparatus according to claim 20 wherein the cable guide member includes a first abutment and a second abutment, and wherein the frame includes a third abutment disposed between the first and second abutments for contacting the first and second abutments and for limiting a range of motion of the cable guide member.

26. The apparatus according to claim 25 wherein the cable guide member includes a bounded opening which forms the first and second abutments, and wherein the frame includes a projecting member which forms the third abutment.

27. An apparatus for guiding a cable comprising:
a frame;
a cable guide member mounted to the frame for rotation around a guide member axis, wherein the cable guide member includes a curved outer peripheral cable guide surface disposed radially outwardly from the guide member axis for guiding the cable;
a first bearing comprising a first roller disposed radially outwardly from the outer peripheral cable guide surface, wherein the first bearing has a first bearing cable guide surface;
a second bearing comprising a second roller disposed radially outwardly from the outer peripheral cable guide surface, wherein the second bearing has a second bearing cable guide surface;
wherein the first bearing is spaced apart from the second bearing in a circumferential direction of the outer peripheral cable guide surface; and
wherein the first bearing and the second bearing are disposed at the same radial distance from the guide member axis.

28. An apparatus for guiding a cable comprising:
a frame;
a cable guide member mounted to the frame for rotation around a guide member axis, wherein the cable guide member includes a curved outer peripheral cable guide surface disposed radially outwardly from the guide member axis for guiding the cable;
wherein the cable guide surface terminates at first and second ends;
wherein the cable guide member includes a first cable guide member abutment; and
wherein the frame includes a frame abutment for contacting the first cable guide member abutment and for limiting a range of motion of the cable guide member.

29. The apparatus according to claim 28 wherein the cable guide surface has an approximately semicircular shape.

30. The apparatus according to claim 28 wherein the cable guide member has an approximately semicircular shape.

31. The apparatus according to claim 28 wherein the cable guide member includes a bounded opening which forms the first cable guide member abutment, and wherein the frame includes a projecting member which forms the frame abutment.

32. The apparatus according to claim 28 wherein the cable guide member includes a second cable guide member abutment, and wherein the frame abutment is disposed between the first and second cable guide member abutments for contacting the first and second cable guide member abutments and thereby limiting a range of motion of the cable guide member.

33. The apparatus according to claim 32 wherein the cable guide member includes a bounded opening which forms the first and second cable guide member abutments, and wherein the frame includes a projecting member which forms the frame abutment.

34. An apparatus for guiding a cable comprising:
a frame;
a cable guide member mounted to the frame for rotation around a guide member axis, wherein the cable guide member includes a curved outer peripheral cable guide surface disposed radially outwardly from the guide member axis for guiding the cable;
wherein a portion of the cable guide member has a noncircular outer peripheral surface when viewed along the guide member axis; and
a bearing disposed radially outwardly from the outer peripheral cable guide surface, wherein the bearing has a bearing cable guide surface.

35. The apparatus according to claim 34 wherein the frame includes a cable duct having a duct opening that aligns between the outer peripheral cable guide surface and the bearing, and wherein the bearing is aligned between the cable duct and the outer peripheral guide surface.

36. The apparatus according to claim 35 wherein the duct opening substantially tangentially aligns with the outer peripheral cable guide surface.

37. The apparatus according to claim 34 wherein the bearing comprises a roller.

38. The apparatus according to claim 37 wherein the roller rotates around a roller axis, wherein the roller axis is substantially parallel to the guide member axis.

39. The apparatus according to claim 34 wherein the cable guide surface terminates at a radially inwardly extending abutment when viewed along the guide member axis.

40. The apparatus according to claim 39 wherein the cable guide surface has a substantially semicircular shape when viewed along the guide member axis.

41. An apparatus for guiding a cable comprising:
a frame;
a cable guide member mounted to the frame for rotation around a guide member axis, wherein the cable guide member includes a curved outer peripheral cable guide surface disposed radially outwardly from the guide member axis for guiding the cable;
wherein a portion of the cable guide member has a noncircular outer peripheral surface when viewed along the guide member axis;
a first bearing disposed radially outwardly from the outer peripheral cable guide surface, wherein the first bearing has a first bearing cable guide surface;
a second bearing disposed radially outwardly from the outer peripheral cable guide surface, wherein the second bearing has a second bearing cable guide surface; and
wherein the first bearing is spaced apart from the second bearing in a circumferential direction of the outer peripheral cable guide surface.

42. The apparatus according to claim 41 wherein the first bearing and the second bearing are disposed at the same radial distance from the guide member axis.

43. The apparatus according to claim 41 wherein the outer peripheral cable guide surface, the first bearing cable guide surface and the second bearing cable guide surface lie in a common plane.

44. The apparatus according to claim 41 wherein the first bearing comprises a first roller, and wherein the second bearing comprises a second roller.

45. The apparatus according to claim 44 wherein the first roller rotates around a first roller axis, wherein the second roller rotates around a second roller axis, wherein the first roller axis and the second roller axis are both substantially parallel to the guide member axis, and wherein the outer peripheral cable guide surface, the first bearing cable guide surface and the second bearing cable guide surface lie in a common plane.

46. The apparatus according to claim 41 wherein the frame includes a first cable duct and a second cable duct.

47. The apparatus according to claim 46 wherein the first cable duct comprises a first tubular member through which the cable passes, and wherein the second cable duct comprises a second tubular member through which the cable passes.

48. The apparatus according to claim 41 wherein the first cable duct includes a first opening that substantially tangentially aligns with the outer peripheral cable guide surface, and wherein the second cable duct includes a second opening that substantially tangentially aligns with the outer peripheral cable guide surface.

49. The apparatus according to claim 46 wherein the first bearing is disposed in close proximity to the first cable duct, and wherein the second bearing is disposed in close proximity to the second cable duct.

50. The apparatus according to claim 46 wherein the first bearing is aligned between the first cable duct and the outer peripheral guide surface, and wherein the second bearing is aligned between the second cable duct and the outer peripheral guide surface.

51. The apparatus according to claim 50 wherein the first cable duct includes a first opening that substantially tangentially aligns with the outer peripheral cable guide surface, and wherein the second cable duct includes a second opening that substantially tangentially aligns with the outer peripheral cable guide surface.

52. The apparatus according to claim 51 wherein the first bearing comprises a first roller, and wherein the second bearing comprises a second roller.

53. The apparatus according to claim 52 wherein the first roller rotates around a first roller axis, wherein the second roller rotates around a second roller axis, wherein the first roller axis and the second roller axis are both substantially parallel to the guide member axis, and wherein the outer peripheral cable guide surface, the first bearing cable guide surface and the second bearing cable guide surface lie in a common plane.

54. The apparatus according to claim 46 wherein the first cable duct is spaced apart from the second cable duct.

55. The apparatus according to claim 54 wherein the first cable duct comprises a first tubular member through which the cable passes, and wherein the second cable duct comprises at second tubular member through which the cable passes.

56. The apparatus according to claim 55 wherein the first bearing comprises a first roller, and wherein the second bearing comprises a second roller.

57. The apparatus according to claim 56 wherein the cable guide member is substantially exposed.

58. The apparatus according to claim 57 wherein the first and second rollers are substantially exposed.

59. The apparatus according to claim 41 wherein the cable guide surface terminates at first and second ends.

60. The apparatus according to claim 59 wherein the cable guide surface has an approximately semicircular shape.

61. The apparatus according to claim 59 wherein the cable guide member has an approximately semicircular shape.

62. The apparatus according to claim 59 wherein the cable guide member includes a first abutment, and wherein the frame includes a second abutment for contacting the first abutment and for limiting a range of motion of the cable guide member.

63. The apparatus according to claim 62 wherein the cable guide member includes a bounded opening which forms the first abutment, and wherein the frame includes a projecting member which forms the second abutment.

64. The apparatus according to claim 59 wherein the cable guide member includes a first abutment and a second abutment, and wherein the frame includes a third abutment disposed between the first and second abutments for contacting the first and second abutments and for limiting a range of motion of the cable guide member.

65. The apparatus according to claim 64 wherein the cable guide member includes a bounded opening which forms the first and second abutments, and wherein the frame includes a projecting member which forms the third abutment.

66. The apparatus according to claim 41 wherein the cable guide surface terminates at a radially inwardly extending abutment when viewed along the guide member axis.

67. The apparatus according to claim 66 wherein the cable guide surface has a substantially semicircular shape when viewed along the guide member axis.

* * * * *